United States Patent [19]

Cole

[11] Patent Number: 5,595,782
[45] Date of Patent: Jan. 21, 1997

[54] OIL-BASED DUST SUPPRESSION SUSPENSION, EMULSION FOR DUST SUPPRESSION, AND METHOD FOR SUPPRESSING DUST

[76] Inventor: Robert Cole, 117 Briarcliff Dr., Moneta, Va. 24121

[21] Appl. No.: 380,384

[22] Filed: Jan. 30, 1995

Related U.S. Application Data

[63] Continuation-in-part of Ser. No. 135,056, Oct. 12, 1993, abandoned.

[51] Int. Cl.⁶ .................... B05D 1/00; C09K 3/32
[52] U.S. Cl. .................... 427/212; 427/220; 44/602; 252/88.1
[58] Field of Search .................... 427/189, 212, 427/220; 252/88; 44/602

[56] References Cited

U.S. PATENT DOCUMENTS

| | | | |
|---|---|---|---|
| 2,195,573 | 4/1940 | Kritchevsky | 94/25 |
| 2,399,465 | 4/1946 | Butcher | 252/88 |
| 2,436,146 | 2/1948 | Kleinicke | 252/88 |
| 2,448,605 | 9/1948 | Kleinicke | 106/123 |
| 4,380,459 | 4/1983 | Netting | 55/87 |
| 4,410,431 | 10/1983 | Roe | 210/728 |
| 4,425,252 | 1/1984 | Cargle et al. | 252/88 |
| 4,582,511 | 4/1986 | Siddoway et al. | 44/6 |
| 4,642,196 | 2/1987 | Yan | 252/88 |
| 4,650,598 | 3/1987 | Roberts et al. | 252/88 |
| 4,897,218 | 1/1990 | Roe | 252/313.1 |
| 4,971,720 | 11/1990 | Roe | 252/313.1 |
| 5,019,375 | 5/1991 | Tanner et al. | 424/66 |
| 5,143,645 | 9/1992 | Roe | 252/313.1 |
| 5,223,165 | 6/1993 | Winstanley et al. | 252/88 |
| 5,282,991 | 2/1994 | Waddoups et al. | 252/35 |

FOREIGN PATENT DOCUMENTS

| | | |
|---|---|---|
| 58-181751 | 10/1983 | Japan . |
| 59-51993 | 3/1984 | Japan . |
| 59-128301 | 7/1984 | Japan . |
| 62-120301 | 6/1987 | Japan . |
| 1391115 | 4/1975 | United Kingdom . |

Primary Examiner—Shrive Beck
Assistant Examiner—David M. Maiorana
Attorney, Agent, or Firm—J. M. (Mark) Gilbreth

[57] ABSTRACT

Disclosed is a dust suppression suspension and method of suppressing dust evolution from a dust generating material by contacting the material with the suspension. The suspension includes sugar polymer particles suspended in an oil base, and further includes a thickener, a surfactant and an emulsifier. The suspension may be applied directly to the dust generating material followed by water addition, or may be emulsified in water and then applied to the material.

27 Claims, No Drawings

OIL-BASED DUST SUPPRESSION SUSPENSION, EMULSION FOR DUST SUPPRESSION, AND METHOD FOR SUPPRESSING DUST

RELATED APPLICATION DATA

This application is a Continuation-In-Part of U.S. application Ser. No. 08/135,056, filed Oct. 12, 1993, now abandoned.

BACKGROUND OF THE INVENTION

1. Field of the Invention

The present invention relates to dust suppression. In another aspect, the present invention relates to a dust suppression suspension, to a dust suppression emulsion, and to a method of suppressing fugitive dust emission. In yet another aspect, the present invention relates to a dust suppression suspension of sugar particles suspended in an oil base, and further including an emulsifier, thickener, surfactant and pour-point depressant, to an emulsion made from such a slurry, and to a method of dust suppression using such slurry and emulsion.

2. Description of the Related Art

Suppression of dust is a common problem that has been of concern to industry for many years and is encountered in a whole host of industrial and other activities.

For example, dust may be generated in mines and ordinary roadways, in playgrounds, training camps, dirt walks and the like.

As another example, dust generation is common in coal mining, cement production and metal ore refining. Dust generation is also common in the transportation of dust generating materials in, for example, truck beds, railroad cars, and trailers. This is especially true of material transported by trains, which travel about 40 or so miles per hour, and even more true when such trains traverse a tunnel, thereby creating turbulence and dust.

In the production of Portland cement, the raw materials utilized include limestone, clay, shale, iron containing materials and siliceous materials. These materials are normally obtained by drilling and blasting techniques with the raw materials then being transported from the quarry to crusher and screening operations.

The crushed and/or screened materials are then further processed to obtain "Portland cement clinker" which consists essentially of hydraulic calcium silicates. Portland cement is generally formed by adding gypsum and then pulverizing the mixture by means of a ball mill or the like. It is then either packaged or stored. The end user adds water, aggregate, sand, etc. to the dry ground clinker-gypsum mixture to form the desired mortar or concrete.

The problem of fugitive dust emission is generally present at the various points in the Portland cement process.

The prior art is replete with instances of attempts to overcome the prior art limitations suppress dust emission.

U.S. Pat. No. 2,195,573, issued Apr. 2, 1940 to Kritchevsky discloses a method of overcoming dust problems in mines and ordinary roadway. As disclosed by Kritchevsky, a prior art method of overcoming dust problems in mines included utilizing an incombustible dust such as stone dust to decrease the inflammability of the coal dust. While suitable to decrease the inflammability of the coal dust, the stone dust does not alleviate the dust problem and actually accentuates it. Other prior art methods included water spraying the dust in roadways and passages and the like, but the water generally has little, if any, affinity for the dust. Accordingly, with water spraying, the water forms in segregated pools on top of the dust with the result not only that the dust situation is not helped, but formation of puddles on the road hinders and makes travel difficult and unsatisfactory. In an effort to overcome the prior art limitations, Kritchevsky discloses the use of an aqueous solution of condensation products of alkylolamines and higher organic acids, especially the higher fatty acids.

U.S. Pat. No. 2,399,465, issued Apr. 30, 1946 to Butcher discloses an improved liquid spraying agent adapted to inhibit the surface dusting of the soil in playgrounds, training camps, dirt walks and the like. As disclosed by Butcher, prior art methods included use of aqueous solutions of calcium chloride and heavy petroleum oils of asphalt base. However, calcium chloride is readily washed away by rain, and the oils are undesirable because of their stickiness, odor, color and rather low wetting power. Butcher discloses a dust laying composition comprising a relatively non-volatile or high-boiling petroleum distillate, admixed with a small amount of oleic acid, either alone or in combination with a metal naphthenate.

U.S. Pat. No. 2,448,605 issued to Kleinicke discloses a novel composition adaptable for use in the treating of coal, coke and the like and more particularly for allaying and preventing dusting of coal, coke and the like. As disclosed by Kleinicke the prior art use of petroleum oil to allay dust was subject to substantial limitation in this it was not substantially effective in the treatment of damp and wet or washed coal due to the immiscibility of water and oil. In an effort to overcome the prior art limitations, Kleinicke disclosed a dust preventative composition comprising an unsaturated fatty acid having 18 carbon atoms, a petroleum oil soluble wetting agent, a low viscosity hydrocarbon distillate.

U.S. Pat. No. 4,380,459, issued Apr. 19, 1983 to Netting discloses a method for removing dust particles from the air by capture by a collapsible aqueous foam having a controlled instability such that less than all of the potential drainage liquid has drained in five minutes after foam generation. The foam generally includes water, a surfactant and a synthetic gum. The synthetic gum is disclosed as being selected from carboxymethyl cellulose, cationic cellulosic resin, hydroxy propyl cellulose, polyethylene oxide resin, polyethylene glycol resin and acrylic acid polymer. The surfactant is disclosed as being a mixture of salts of alkylated benzene sulfonic acids.

U.S. Pat. No. 4,425,252, issued Jan. 10, 1984 to Cargle et al. discloses a method for the abatement of respiratory coal dust by the spraying of an aqueous solution, comprising a water soluble salt of an alkyl aryl sulfonic acid and a nonionic surfactant having an HLB of from about 10 to about 16, on a coal seam face being mined so as to readily wet the coal dust adjacent thereto resulting in the rapid removal of the dust from the air.

U.S. Pat. No. 4,897,218, issued Jan. 30, 1990 to Roe discloses a method of suppressing dust generation emanating from cement clinker by applying a foamed water/surfactant solution thereto. The surfactant is generally selected from sodium dodecylbenzene sulfonates, sodium lauryl sulfates, sodium alpha olefin sulfonates and sodium salts of fatty acids. The surfactant is generally diluted with water at the job site, foamed and sprayed as a foam on the hot cement clinker.

U.S. Pat. No. 4,971,720, issued Nov. 20, 1990 and U.S. Pat. No. 5,143,645, issued Sep. 1, 1992, both to Roe disclose a method for suppressing process dust emissions by applying a foam formed from demineralized water and a foaming agent. The foaming agent is selected from among salts of fatty acids, alkyl sulfates, and alkyl aryl sulfonates.

Parent U.S. application Ser. No. 08/135,056 disclosed application of water and polysaccharide to dust emitting materials to suppress dust generation. One application method was the direct application of a water and polysaccharide solution, which suffered from a high viscosity and thus subsequent application difficulties, from bacterial attack on the solution, and from poor economics resulting from the transport of low solids solutions in water. An alternative application method of applying dry polysaccharide to the dust emitting material followed by application of water, suffered from the need for specialized equipment and other operational difficulties.

Thus, in spite of the above methods of suppressing dust emission, there still exists a need in the art for an improved method of suppressing dust.

Other needs in the art will become evident to those of skill in the art upon review of this patent specification.

SUMMARY OF THE INVENTION

Thus it is an object of the present invention to provide for an improved method of dust suppression which does not suffer from the disadvantages of the prior art methods.

Other objects of the present invention will become evident to those of skill in the art upon review of this patent specification.

According to one embodiment of the present invention there is provided a dust suppression suspension of sugar particles suspended in an oil base, and further including an emulsifier, a thickener, a surfactant and an optional pour-point depressant.

In the preparation of the additive of the present invention, the sugar is slurried in the oil followed by addition of an emulsifier. After the thickener is added to the slurry, a surfactant is added to the slurry to activate the thickener thereby suspending the sugar particles in the oil. An emulsifier is also added to allow for emulsification of the slurry when it is vigorously mixed with water. For certain oils under cold conditions, a pour point depressant is utilized to keep the suspension in a pourable state.

In the practice of the present invention, any naturally occurring or synthetic sugar may be utilized provided that the sugar will form a suitable dust suppressing coating on the surface of the dust generating material. The sugar applied to the dust generating material forms a thick viscous gel-like coating, thus substantially preventing dust evolution.

Generally, the sugars utilized in the present invention are generally composed of monosaccharide sugars, and preferably are water-soluble or water-dispersable gums, otherwise known as polysaccharides or high-polymer sugars, having nine or more monosaccharide units linked together by glycosidic bonds.

Monosaccharide groups suitable for use in the polysaccharides of the present invention generally include arabinose, fructose, galactose, glucose, mannose, sorbose and xylose.

Suitable naturally occurring polysaccharides useful in the practice of the present invention include gum arabic, guar gum, karaya gum, gum tragacanth, xanthan gum, and phycocolloids, for example, carrageenan, algin and agar.

According to another embodiment of the present invention there is provided an dust suppression emulsion which includes the above described dust suppression suspension which is emulsified in water.

According to even another embodiment of the present invention there is provided a method of suppressing dust from a dust emitting source, which includes application of the dust suppression emulsion to the dust emitting source.

According to still another embodiment of the present invention there is provided a method of suppressing dust from a dust emitting source, which includes application of the dust suppression suspension to the dust emitting source, followed by the application of water to activate the suspension.

DETAILED DESCRIPTION OF THE INVENTION

The dust suppression suspension of the present invention generally includes sugar particles suspended in an oil base, and further including an emulsifier, a thickener, a surfactant and an optional pour-point depressant.

In the practice of the present invention, any naturally occurring or synthetic sugar which is not soluble in the oil base, may be utilized provided that the sugar will form a suitable dust suppressing coating on the surface of the dust generating material. In addition, another factor to consider in selecting a sugar to be utilized in the present invention, is the effect that the sugar will have on any further processing of the material. Also, where an issue, environmental effects of the sugar should also be considered.

While not wishing to be limited by theory, applicants believe that the sugar applied to the dust generating material forms a thick viscous gel-like coating, thus substantially preventing dust evolution.

Generally, in the practice of the present invention, the sugar utilized may be a naturally occurring compound or synthetic compound. The type of sugar is generally selected to provide a sugar that will provide a suitable barrier to dust generation.

Generally, the sugars utilized in the present invention are composed of monosaccharide sugars. Preferably, the sugars utilized in the present are water-soluble or water-dispersable gums, otherwise known as polysaccharides or high-polymer sugars, having nine or more monosaccharide units linked together by glycosidic bonds.

Monosaccharide groups suitable for use in the polysaccharides of the present invention generally include arabinose, fructose, galactose, glucose, mannose, sorbose and xylose. Preferable monosaccharide groups suitable for use in the present invention include galactose and mannose.

Suitable naturally occurring polysaccharides useful in the practice of the present invention include gum arabic, guar gum, karaya gum, gum tragacanth, xanthan gum, and phycocolloids, for example, carrageenan, algin and agar. Guar gum is the preferred naturally occurring polysaccharide useful in the present invention.

Selection of which naturally occurring polysaccharide to utilize will generally depend upon compatibility of the polysaccharide with the dust generating material, and will be further dictated by the subsequent process to which the material will be subjected, by environmental concerns and any economic factors.

At a minimum, the concentration of the polysaccharide in the suspension must be sufficient such that when utilized as a dust suppressant, a suitable sugar layer will be formed that provides a barrier to the evolution of dust. At higher concentrations, the polysaccharide suspension viscosity will increase to a point at which the solution cannot be easily processed. Thus, the upper limit for the concentration of the polysaccharide in the suspension will generally be dictated by the viscosity of the solution. Of course, higher concentrations of polysaccharide can by utilized with the addition of pour point depressants.

Generally, in the practice of the present invention, the suspension will comprise in the range of about 1 to about 99 weight percent polysaccharide. Preferably, the solution of the present invention will comprise in the range of about 10 to about 75 weight percent polysaccharide, more preferably in the range of about 20 to about 50 weight percent polysaccharide, and most preferably in the range of about 30 to about 50 weight percent polysaccharide.

Any suitable oil that can function as the base carrier may be utilized in the present invention. The oil must be pourable or rendered pourable at the application conditions. Examples of suitable oils include paraffinic oils, naphthenic oils and aromatics oils. Preferably, paraffinic oils are utilized in the present invention. The preferred paraffinic oil has a viscosity in the range of about 65 SUS to about 2280 SUS @100° F., a specific gravity in the range of about 0.8524 to about 0.8899 @60° F., a molecular weight in the range of about 320 to about 1000, and a refraction index in the range of about 201 to about 267.

In the suspension of the present invention, the oil will generally comprise in the range of about 10 to about 90 weight percent of the suspension. Preferably, the oil will comprise in the range of about 30 to about 80 weight percent of the suspension, more preferably in the range of about 40 to about 70 weight percent of the suspension, and most preferably in the range of about 50 to about 65 weight percent of the suspension.

In the practice of the present invention, any suitable emulsifier may be utilized that will cause the suspension to emulsify upon turbulent mixing with water. Preferably the emulsifier utilized is a cationic emulsifier. Non-limiting examples of suitable cationic emulsifiers include those with a tallow backbone whose fatty alkyl portion may be represented by the structure $RNH_2$, such as tallowalkylamine, and primary, secondary and tertiary amines.

The amount of emulsifier utilized must be suitable to cause the suspension to emulsify upon turbulent mixing with water. Generally, the emulsifier will comprise in the range of about 0.1 to about 25 weight percent of the suspension. Preferably, the emulsifier will comprise in the range of about 0.5 to about 15 weight percent of the suspension, more preferably in the range of about 1 to about 10 weight percent of the suspension, and most preferably in the range of about 3 to about 7 weight percent of the suspension.

In the practice of the present invention, any suitable thickener may be utilized that will function to suspend the sugar particles in the suspension. Preferably, clay is utilized as the thickening agent in the present invention. Suitable clays include organo clays, such as bentonite clay (tetraalkyl ammonium bentonite). Other suitable clays include various forms of colloidal clays made up of metal silicates. For example, clays having aluminum silicates composed primarily of montmorillonite.

The amount of clay utilized in the suspension must be suitable to cause the suspension of the sugar particles. Generally, the clay will comprise in the range of about 0.1 to about 15 weight percent of the suspension. Preferably, the clay will comprise in the range of about 0.5 to about 10 weight percent of the suspension, more preferably in the range of about 0.5 to about 5 weight percent of the suspension, and most preferably in the range of about 1 to about 5 weight percent of the suspension.

With some thickening agents, a surfactant must be utilized to activate the thickening agent. For example, clay must be utilized with a surfactant to active the clay particles and promote the intumescence of the clay particles to provide the desired viscosity for suspension of the sugar particles. While the viscosity will vary for different types of sugars, to promote suspension of the sugar particles, the suspension viscosity will generally be in the range of about 500 to about 5000, and most preferably in the range of about 1000 to about 2500 cps.

Suitable surfactants are generally oil-soluble, nonionic surfactants. For clay it is preferred that an oil-soluble, non-ionic surfactant such as an ethoxylate be utilized. Suitable ethoxylates include ethoxylated phenols, for example, ethoxylated nonyl phenol containing moles of ethoxylation and having an Atlas HLB value of 8.9, or ethoxylated octylphenol.

The surfactant is generally utilized in the suspension in an amount suitable to activate the thickening agent. Generally, the surfactant will comprise in the range of about 0.1 to about 15 weight percent of the suspension. Preferably, the surfactant will comprise in the range of about 0.5 to about 10 weight percent of the suspension, more preferably in the range of about 0.5 to about 5 weight percent of the suspension, and most preferably in the range of about 1 to about 5 weight percent of the suspension.

If necessary to render the suspension pourable, a pour-point depressant for the oil may be utilized. The pour-point depressant is added to the suspension at a level in the range of about 100 to about 500 ppm, to provide a suspension pour point in the range of about 4000 to about 10000 cps at 0° F. Examples of a pour-point depressant include a copolymer of ethylene and vinyl acetate dissolved in aromatic naphtha.

In the practice of the present invention, the suspension is generally made by slurrying the sugar in the oil utilizing a high speed mixer. The emulsifier is then added to the slurry, followed by the additional of the thickening agent. The thickening agent is then activated to produce a suspension. The pour-point depressant is added if necessary to maintain a suitable pour-point.

In application to a dust emitting source, the suspension is mixed with water to emulsify the oil to form a low viscosity emulsion. Preferably the suspension is introduced into a water stream passing through an in-line mixer to form the low viscosity emulsion. Generally, the ratio of suspension to water is in the range of about 1:1000 to about 1:1, preferably in the range of about 1:500 to about 1:10, and most preferably in the range of about 1:400 to about 1:20. The dilution of the suspension with water will be controlled by economics and application variables.

Upon application of the low viscosity emulsion, the emulsion breaks, leaving the sugar in contact with the water. The polysaccharide sugar will then swell forming a gelatinous film that penetrates and covers dust emitting source to bond the fine dust particles, thereby preventing dust emission.

In the practice of the present invention, the low viscosity emulsion will be applied to the dust generating material in an amount sufficient to form a dust barrier layer.

Generally, the low viscosity emulsion of the present invention will be applied at the rate of about 0.01 to about 10 gallons of emulsion per square yard of surface area of dust generating material. Preferably, in the practice of the present invention, the emulsion is applied at the rate of about 0.1 to about 5 gallons emulsion per square yard of surface area of dust generating material, most preferably at the rate of about 0.1 to about 1 gallon, and still most preferably at the rate of about 0.1 to about 0.5 gallons emulsion per square yard of surface area of dust generating material.

Most commonly, it is anticipated that in the practice of the present inventive method, the emulsion will be sprayed onto the dust generating material utilizing a sprayer in liquid communication with a holding tank containing the emulsion. A pump may be utilized to spray the solution, or the tank may be pressurized to force the emulsion through the sprayer. Of course, under the proper conditions, the emulsion may be gravity fed to the dust generating material.

In an optional embodiment of the present invention, another application method includes the direct application of the suspension to the dust emitting source, followed by the application of water.

When the suspension is applied directly to the dust generating material, it is generally applied in an amount suitable to form a dust barrier layer once the water is added. Generally, the suspension is applied to the dust generating material using the rates described above for the application of the emulsion, however, adjusting of course for the water dilution. Thus, the suspension could be applied at the same rate as the emulsion or as little as 1/1000th of the rate.

Once the suspension has been applied to the dust generating material, water is then applied to form a dust barrier. The ratio of the amount of suspension applied to the amount of water applied is generally in the range of about 1:1000 to about 1:1, preferably in the range of about 1:500 to about 1:10, and most preferably in the range of about 1:400 to about 1:20.

It is believed that the embodiments of the present invention can be utilized on all manner of dust generating material.

EXAMPLES

Examples 1–4 are for the invention of the parent application which utilized a polysaccharide/water mixture for dust suppression.

Examples 5–6 are for the invention of the present invention utilizing an oil-based polysaccharide suspension.

EXAMPLES 1–4

Sample Preparation

Test trays of 2kg each of Eastern U.S. coals and Powder River Basin coals were loaded and profiled to a 40 degree angle of repose. Repetitive samples of coal trays were sprayed with an aqueous solution of 1% guar gum. Comparative samples were sprayed with separate 1% aqueous solutions of polyvinyl acetate, surfactants (anionic and nonionic), oil emulsions, polyvinyl acetate-acrylics, and polyacrylates. Test trays were dried in direct sunlight at 88° F.

Example 1

Simulated Railroad Movement

Test trays prepared as described in the Sample Preparation section above were subjected to vibratory action of 1000 cycles/min to simulate rail movement of coal, for a duration of 15 minutes. Results are shown in Table I.

TABLE I

| simulated railroad movement | |
|---|---|
| 1% aqueous solution | observation of crust condition after vibrations |
| guar gum | no fractures, solid mass |
| surfactants | dry, dusty surface |
| oil emulsions | dry, dusty surface |
| synthetic polymers | |
| PVA | thin crust exhibiting fissures |
| PVA-acrylic | thin crust exhibiting fissures |
| PVA-acrylate | thin crust exhibiting fissures |

Example 2

Wind Effects

Test trays prepared as described in the Sample Preparation section above were subjected to a wind speed of 20 mph for one hour to observe windblown loss from samples profiled at a 40 degree angle of repose. Results are presented in Table II.

TABLE II

| effect of 20 mph wind | |
|---|---|
| 1% aqueous solution | observation of crust condition after 20 mph wind |
| guar gum | surface remained intact, no coal loss |
| surfactants | abundant coal loss, clouds of dust emanated from surface |
| oil emulsions | abundant coal loss, clouds of dust emanated from surface |
| synthetic polymers | |
| PVA | fractured particles of crusts blew free from surface exposing underlying coal to wind erosion |
| PVA-acrylic | fractured particles of crusts blew free from surface exposing underlying coal to wind erosion |
| PVA-acrylate | fractured particles of crusts blew free from surface exposing underlying coal to wind erosion |

Example 3

Rain with 20 mph Wind

Test samples prepared as described in the Sample Preparation section above were wetted with the equivalent of 0.25 inches of rainfall and then allowed to dry an additional 2 hours at 88° F. These samples were then stressed at a wind speed of 20 mph for one hour.

TABLE III

| rain with 20 mph wind | |
|---|---|
| 1% aqueous solution | observation of crust condition after rain and 20 mph wind |
| guar gum | surface remained intact, no coal loss |
| surfactants | failed and exhibited wind erosion at velocities below 10 mph. |
| oil emulsions | failed and exhibited wind |

TABLE III-continued

| rain with 20 mph wind | |
|---|---|
| 1% aqueous solution | observation of crust condition after rain and 20 mph wind |
| synthetic polymers | erosion at velocities below 10 mph |
| PVA | failed and exhibited wind erosion at velocities below 10 mph |
| PVA-acrylic | failed and exhibited wind erosion at velocities below 10 mph |
| PVA-acrylate | failed and exhibited wind erosion at velocities below 10 mph |

Example 4

Freeze Thaw Cycle

Test samples prepared as described in the Sample Preparation section above, except instead of being dried at 88° F., the samples were first frozen at 0° F. for 2 hours, thawed, dried in direct sun for 2 hours at 88° F., then subjected to wind speeds of 20 mph for one hour.

TABLE IV

| freeze thaw cycle ("FTC") | |
|---|---|
| 1% aqueous solution | observation of crust condition freeze thaw cycle w/20 mph |
| guar gum | formed hard integral crust after FTC, withstood 20 mph wind intact with no coal loss |
| surfactants | lost crust integrity after FTC, exhibited wind erosion at velocities below 10 mph |
| oil emulsions | lost crust integrity after FTC, exhibited wind erosion at velocities below 10 mph |
| synthetic polymers | |
| PVA | lost crust integrity after FTC, exhibited wind erosion at velocities below 10 mph |
| PVA-acrylic | lost crust integrity after FTC, exhibited wind erosion at velocities below 10 mph |
| PVA-acrylate | lost crust integrity after FTC, exhibited wind erosion at velocities below 10 mph |

Example 5

Utilizing the Formula:

TABLE V

| Component | Weight Percent |
|---|---|
| Mineral Oil | 61 |
| Emulsifier | 3 |
| Sugar Polymer | 30 |
| Thickener | 3 |
| Non-ionic surfactant | 3 |

A one gram sample of the above formula is diluted to 30 grams with water using light agitation. With time, the following observations are made.

TABLE VI

| Time | Observation | Viscosity (cps) |
|---|---|---|
| 0 | White emulsion formed | 20 |
| 30 sec | White emulsion formed | 100 |
| 60 sec | White emulsion formed | 300 |
| 3 min | White emulsion formed | 1000 |
| 1 hr | Emulsion has broken | 10000 |
| 24 hrs | Emulsion has broken | 50000–100000 |
| >24 hrs | Film becomes rubbery, gelatinous mass. Addition of water at this point rehydrates samples to repeat cycle. | |

Using the above formulation, the emulsified mix may be sprayed upon fine coal, and the penetration of the emulsion can be measured at a depth of about 2 to 3 inches, giving an intergral crust upon drying.

Example 6

Field tests were conducted on trains carrying coal along an approximately 450 mile trip across Virginia at speeds ranging from 0 to 40 miles per hour, depending upon track and other conditions. The trains were initially loaded with fine, metallurgical coal, with some cars topped with the formulation of Example 5 and some untreated. Upon arrival at the destination, the surface condition of the coal is examined. Dust monitors and passive collectors are mounted on the treated and untreated cars at the origin point to measure dust evolved in route. The results are presented in Table VII and are as follows:

TABLE VII

| | UNTREATED CARS | TREATED CARS |
|---|---|---|
| % CRUST RETENTION ON COAL SURFACE | NONE-COAL IS ERODED AND LOST FROM SURFACE | 85% TO 95% INTACT COAL CRUST ON SURFACE OF CARS |
| COAL LOST BY EROSION | 100–200 LBS/CAR DETECTED BY WEIGHING | NO DETECTABLE COAL LOSS BY WEIGHING |
| AMOUNT OF DUST COLLECTED BY PASSIVE COLLECTORS EN ROUTE | 150–250 GRAMS | 5–20 GRAMS |

The present invention finds utility in the suppression of dust. Applications for the present invention include, but are not limited to, dust from environmentally exposed mounds of dust generating material such as clay or coal, or wind-blown dust from railroad cars filled with dust generating material.

Specific uses include the covering of all types of mineral stockpiles, top coating of trucks, barges, trains and other transport vehicles carrying ores, and dust control on dry minerals that are under process in mines.

The description given herein is intended to illustrate the preferred embodiments of the present invention. It is possible for one of ordinary skill in the art to make various changes to the details of the present invention, without departing from the spirit of this invention. Therefore, it is intended that all such variations be included within the scope of the present invention as claimed.

I claim:

1. A dust suppression suspension comprising:
   (a) an oil base;
   (b) sugar particles suspended in the oil base;
   (c) a thickening agent for suspending the sugar particles in the oil base;
   (d) a thickening agent activator; and
   (d) an emulsifier.

2. The suspension of claim 1 wherein the sugar is a polysaccharide.

3. The suspension of claim 2 wherein the polysaccharide comprises at least 9 monosaccharide units, and wherein the monosaccharide units are selected from the group of monosaccharide units consisting of arabinose, fructose, galactose, glucose, mannose, sorbose and xylose.

4. The suspension of claim 2 wherein the polysaccharide comprises at least one selected from the group consisting of gum arabic, guar gum, karaya gum, gum tragacanth, xanthan gum, and phycocolloids.

5. The suspension of claim 1 wherein the oil-base comprises an paraffinic, naphthenic or aromatic oil, the sugar comprises a polysaccharide, the thickening agent comprises clay, the thickening agent activator comprises an oil-soluble non-ionic surfactant, and the emulsifier comprises a cationic emulsifier.

6. The suspension of claim 2 wherein the oil-base comprises a mineral oil, the sugar comprises guar gum, the thickening agent comprises bentonite clay, the thickening agent activator comprises an ethoxylated phenol, and the emulsifier comprises an amine.

7. The suspension of claim 6 further comprising a pour-point depressant.

8. The suspension of claim 1 wherein the suspension comprises in the range of about 10 to about 75 weight percent sugar particles, about 30 to about 80 weight percent oil, about 0.5 to about 15 weight percent emulsifier, about 0.5 to about 10 weight percent thickening agent, and about 0.5 to about 10 weight percent activator.

9. The suspension of claim 8 wherein the oil-base comprises a mineral oil, the sugar comprises guar gum, the thickening agent comprises bentonite clay, the thickening agent activator comprises an ethoxylated phenol, and the emulsifier comprises an amine.

10. A method of suppressing dust evolution from a dust generating material comprising contacting the dust generating material with an aqueous emulsion of a suspension, wherein said suspension comprises an oil base; sugar particles suspended in the oil base; a thickening agent for suspending the sugar particles in the oil base; a thickening agent activator; and an emulsifier.

11. The method of claim 10 wherein the sugar is a polysaccharide.

12. The method of claim 11 wherein the polysaccharide comprises at least 9 monosaccharide units, and wherein the monosaccharide units are selected from the group of monosaccharide units consisting of arabinose, fructose, galactose, glucose, mannose, sorbose and xylose.

13. The method of claim 11 wherein the polysaccharide comprises at least one selected from the group consisting of gum arabic, guar gum, karaya gum, gum tragacanth, xanthan gum, and phycocolloids.

14. The method of claim 10 wherein the oil-base comprises an paraffinic, naphthenic or aromatic oil, the sugar comprises a polysaccharide, the thickening agent comprises clay, the thickening agent activator comprises an oil-soluble non-ionic surfactant, and the emulsifier comprises a cationic emulsifier.

15. The method of claim 11 wherein the oil-base comprises a mineral oil, the sugar comprises guar gum, the thickening agent comprises bentonite clay, the thickening agent activator comprises an ethoxylated phenol, and the emulsifier comprises an amine.

16. The method of claim 15 further comprising a pour-point depressant.

17. The method of claim 10 wherein the suspension comprises in the range of about 10 to about 75 weight percent sugar particles, about 30 to about 80 weight percent oil, about 0.5 to about 15 weight percent emulsifier, about 0.5 to about 10 weight percent thickening agent, and about 0.5 to about 10 weight percent activator.

18. The method of claim 17 wherein the oil-base comprises a mineral oil, the sugar comprises guar gum, the thickening agent comprises bentonite clay, the thickening agent activator comprises an ethoxylated phenol, and the emulsifier comprises an amine.

19. A method of suppressing dust evolution from a dust generating material comprising:
   (a) contacting the dust generating material with a suspension, wherein said suspension comprises an oil base; sugar particles suspended in the oil base; a thickening agent for suspending the sugar particles in the oil base; a thickening agent activator; and an emulsifier; and
   (b) contacting the suspension with water.

20. The method of claim 19 wherein the sugar is a polysaccharide.

21. The method of claim 20 wherein the polysaccharide comprises at least 9 monosaccharide units, and wherein the monosaccharide units are selected from the group of monosaccharide units consisting of arabinose, fructose, galactose, glucose, mannose, sorbose and xylose.

22. The method of claim 20 wherein the polysaccharide comprises at least one selected from the group consisting of gum arabic, guar gum, karaya gum, gum tragacanth, xanthan gum, and phycocolloids.

23. The method of claim 19 wherein the oil-base comprises an paraffinic, naphthenic or aromatic oil, the sugar comprises a polysaccharide, the thickening agent comprises clay, the thickening agent activator comprises an oil-soluble non-ionic surfactant, and the emulsifier comprises a cationic emulsifier.

24. The method of claim 20 wherein the oil-base comprises a mineral oil, the sugar comprises guar gum, the thickening agent comprises bentonite clay, the thickening agent activator comprises an ethoxylated phenol, and the emulsifier comprises an amine.

25. The method of claim 24 further comprising a pour-point depressant.

26. The method of claim 19 wherein the suspension comprises in the range of about 10 to about 75 weight percent sugar particles, about 30 to about 80 weight percent oil, about 0.5 to about 15 weight percent emulsifier, about 0.5 to about 10 weight percent thickening agent, and about 0.5 to about 10 weight percent activator.

27. The method of claim 26 wherein the oil-base comprises a mineral oil, the sugar comprises guar gum, the thickening agent comprises bentonite clay, the thickening agent activator comprises an ethoxylated phenol, and the emulsifier comprises an amine.

* * * * *